United States Patent [19]

Sano

[11] 4,116,658
[45] Sep. 26, 1978

[54] METHOD OF COATING SUBSTRATE FOR LIQUID CRYSTAL DISPLAY DEVICE

[75] Inventor: Shunichi Sano, Zama, Japan

[73] Assignee: Tokyo Shibaura Electric Co., Ltd., Kawasaki, Japan

[21] Appl. No.: 863,048

[22] Filed: Dec. 21, 1977

[30] Foreign Application Priority Data

Jan. 24, 1977 [JP] Japan .................................. 52-5805

[51] Int. Cl.² ........................ C03C 17/02; C03C 17/30
[52] U.S. Cl. ........................................ 65/42; 65/60 A; 65/60 D; 350/341
[58] Field of Search ............. 65/42, 60 A, 60 B, 60 C, 65/60 D, 36; 350/339, 340, 341

[56] References Cited

U.S. PATENT DOCUMENTS 3,242,007  3/1966  Jensen .............................. 65/60 A X
3,787,110  1/1974  Berreman et al. .................. 350/341
3,832,034  8/1974  Edmonds ........................... 350/339
3,885,860  5/1975  Sorkin .............................. 350/341

FOREIGN PATENT DOCUMENTS 50-80,853  7/1975  Japan.

*Primary Examiner*—Arthur D. Kellogg
*Attorney, Agent, or Firm*—Oblon, Fisher, Spivak, McClelland & Maier

[57] ABSTRACT

A method of treating the substrate for a liquid crystal display device to permit unidirectional alignment of the liquid crystal molecules, comprising the steps of forming a silicon dioxide film on the electrode-bearing surface of a substrate, laminating a silicon film on the silicon dioxide film, rubbing the surface of the silicon film in a predetermined direction, and subjecting the substrate a heat treatment.

7 Claims, 2 Drawing Figures

METHOD OF COATING SUBSTRATE FOR LIQUID CRYSTAL DISPLAY DEVICE

BACKGROUND OF THE INVENTION

This invention relates to a method of treating the glass substrate for a liquid crystal display device, more particularly, to a method of treating the glass substrate to permit unidirectional alignment of the liquid crystal molecules on a horizontal plane.

Presently, most of liquid crystal display devices are of twisted nematic (TN) type which is advantageous in that the power consumption is small and that the device can be operated at a low voltage. In the TN type liquid crystal display device, the liquid crystal molecules are unidirectionally aligned with respect to the electrode-bearing surface of the substrate. Further, the alignment directions of the molecules are twisted by 90° between the upper substrate and the lower substrate of a cell. To this end, two glass substrates each treated to permit unidirectional alignment of the liquid crystal molecules are disposed parallel with each other such that the alignment direction permitted by one of the two substrates is perpendicular to that permitted by the other substrate.

Two conventional methods are available for treating the substrate to enable the electrode-bearing surface to permit unidirectional alignment of the liquid crystal molecules, i.e., a slant vapor deposition method and a rubbing method.

The slant vapor deposition method comprises the step of depositing SiO, Pt, Au, Cu, Pb, Al, Sn, Ag, Cr, etc. on the substrate at an inclination of about 5° with respect to the substrate surface. The slant vapor deposition method is advantageous in that the aligning property of the liquid crystal is not disturbed even if the substrate is exposed to high temperatures at the frit seal step. However, the requirement of a very small inclination angle of the deposition layer renders it difficult to control the vapor deposition operation when it comes to a large substrate having any of the sides exceeding 2cm. In the case of a substrate sized, for example, 10cm×5cm, it is necessary to dispose the means for evaporating the deposition material at a distance of more than 50cm from the substrate. Otherwise, a deposition layer of a predetermined inclination angle can not be obtained over the entire surface of the substrate, failing to perform a desired unidirectional alignment of the liquid crystal molecules.

The long distance of the evaporation means from the substrate leads to a very unfavorable productivity of the substrate, including an increased scattering, or loss, of the deposition material, an elongated deposition time and requirement of a large vapor deposition apparatus.

An additional difficulty inherent in the slant vapor deposition method is that the tilt angle, i.e., the angle made between the liquid crystal molecule and the substrate surface, is large, resulting in a low contrast and a narrow visual angle of the liquid crystal display device comprising such a substrate.

On the other hand, the rubbing method comprises the steps of forming an SiO film on the electrode-bearing surface of the substrate and rubbing the surface of the SiO film with de-fatted cotton, or the like. The substrate treated by the rubbing method is not satisfactory in durability against heat. Further, the aligning property of the liquid crystal tends to be disturbed when a cell comprising such a substrate is subjected to frit seal, resulting in a markedly short life of the liquid crystal display device. Accordingly, it was customary to employ the slant vapor deposition method for the case of involving a frit seal, in order to obtain stability and reliability of the liquid crystal display device.

SUMMARY OF THE INVENTION

An object of this invention is to provide a method of treating the substrate for a liquid crystal display device to enable the substrate, even if a large one, to permit unidirectional alignment of the liquid crystal on a horizontal plane.

Another object is to provide a method of treating the substrate to enable the substrate to exhibit a sufficiently high durability against frit seal and to be suitable for producing a liquid crystal display device of a long life.

According to this invention, there is provided a method of treating the substrate for a liquid crystal display device to permit unidirectional alignment of the liquid crystal molecules, comprising the steps of forming a transparent oxide film on the electrode-bearing surface of the substrate, laminating a silicon film on the transparent oxide film, rubbing the surface of the silicon film in a predetermined direction, and subjecting the substrate to a heat treatment. A preferred oxide film formed on the substrate surface is provided by silicon dioxide, aluminum oxide, yttrium oxide or titanium oxide. Particularly preferred is a silicon dioxide film.

In a preferred embodiment, the heat treatment mentioned may be carried out simultaneously with the frit seal.

DETAILED DESCRIPTION OF THE PREFERRED EMBODIMENTS

Figure 1:
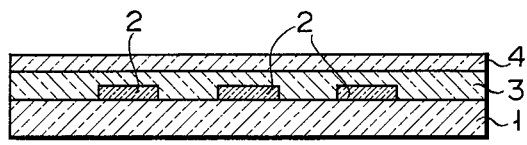
FIG. 1 is a cross-sectional view of a glass substrate treated in accordance with one embodiment of this invention.

Referring to FIG. 1, a reference numeral 1 denotes a transparent substrate like, for example, a glass substrate. As shown in the drawing, a transparent electrode 2 is formed by an ordinary method on the substrate 1. The electrode 2 may be formed of ordinary materials such as indium oxide and stannic oxide.

A silicon dioxide film 3 is formed on the electrode-bearing surface of the substrate 1 in a thickness sufficient to prevent the flow of direct current and to prevent the permeation of alkali metal ions contained in the glass substrate 1. In general, the silicon dioxide film 3 meeting the above requirement is 100 to 3,000Å thick. Ordinary methods such as vapor deposition, sputtering, chemical vapor deposition, as well as coating and baking of silane derivatives may be employed for forming the silicon dioxide film 3.

A silicon film 4 is then formed on the silicon dioxide film 3 in a thickness of 50 to 300Å, preferably, 70 to 100Å, thereby providing a structure as shown in FIG. 1. A silicon film thinner than 50Å fails to achieve a desired alignment of the liquid crystal. On the other hand, a silicon film thicker than 300Å fails to be sufficiently oxidized and made transparent in the subsequent heat treatment step. However, a silicon film may be formed thicker than 300Å if the heat treatment is conducted under a strong oxidation condition separately from the heat treatment for the frit seal. Ordinary methods such as vapor deposition, sputtering, and chemical vapor deposition may be employed for forming the silicon film 4.

The surface of the silicon film 4 is rubbed in a predetermined direction with a de-fatted cotton, felt paper, etc. in accordance with an ordinary method. Since silicon is gradually oxidized in the air, it is preferred to carry out the rubbing operation as soon as the silicon film 4 has been formed. If it is unavoidable to defer the rubbing operation for a long time, it is desired to keep the silicon film-bearing substrate in an atmosphere free from oxygen and water.

Figure 2:
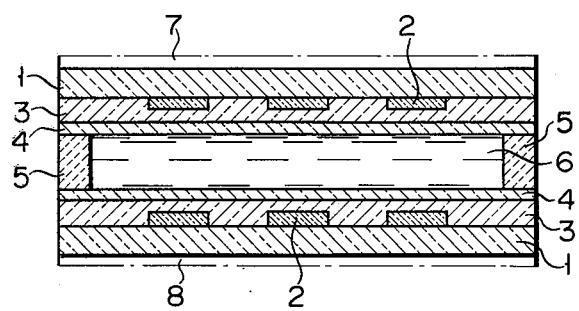
FIG. 2 is a cross-sectional view of a liquid crystal display device formed by using the substrate shown in FIG. 1.

The subsequent step of heat treatment is conveniently performed simultaneously with the frit seal. Specifically, two substrates 1, 1 are disposed suitably apart from each other such that the silicon films 4, 4 of the substrates face each other and the rubbing directions of the silicon films 4, 4 are perpendicular to each other. Then, the two substrates are sealed along the outer periphery thereof with a frit glass 5, 5 as shown in FIG. 2 to leave the clearance therebetween, thus providing a cell. A heat treatment at a temperature of about 200° to 600° C. is required for this frit seal depending on the kind of the frit glass. It is important to note that the heat treatment of this invention for the oxidation of the silicon film 4 is performed simultaneously with the heat treatment for the frit seal. Of course, it is possible to apply the heat treatment for the silicon film oxidation prior to the step of assembling the cell as shown in FIG. 2. The temperature and heating time for the heat treatment step of this invention depend on the thickness of the silicon film, the atmosphere of heating, etc. Any way, it suffices to oxidize the silicon film into a transparent oxide film in the heat treatment step.

Finally, a nematic liquid crystal 6 having a positive dielectric anisotropic property is loaded in the free space of the cell and light-polarizing plates 7, 8 are mounted to the outer surfaces of the cell as shown in FIG. 2, thereby forming a liquid crystal display device.

A liquid crystal display device comprising the substrate treated by the method of this invention is free from the disturbance of the liquid crystal alignment, exhibits a long life and, even if the device is large in size, performs a stable display function. In addition, the tilt angle between the liquid crystal molecule and the substrate surface is small because the rubbing method is employed for achieving the liquid crystal alignment, leading to a good contrast and a wide visual angle.

As described in detail, the method of this invention is based essentially on the rubbing method. Nevertheless, the aligning property of the liquid crystal is not disturbed though the frit seal is carried out at a high temperature, rendering it possible to provide a liquid crystal display device of a long life and a high stability.

In this invention, it is important to coat the glass substrate with an oxide film like a silicon dioxide film and with a silicon film in the order mentioned. The lack of either of these films results in a failure to obtain the particular effects of this invention. Namely, disturbance of the liquid crystal alignment is caused if the glass substrate coated with only one of these films is subjected to the frit seal. In addition, the alkali metal permeates from the glass substrate onto the surface of the oxide film or the silicon film, resulting in a short life of the liquid crystal display device.

In terms of the film-forming operation, it is convenient to use a silicon dioxide film as the oxide film. Where vapor deposition is employed, it is possible to carry out the film-forming operation in a single apparatus by using two evaporation source of a silicon dioxide and a silicon. Likewise, a single apparatus provided with a silicon dioxide target and a silicon target may be used for forming the silicon dioxide film and the silicon film for the case of employing the sputtering method. The use of a silicon dioxide film as the oxide film is also advantageous for the case of employing the chemical vapor deposition method. In this case, a silicon film can be formed by simply stopping the oxygen supply to the reaction apparatus after the formation of a silicon dioxide film. Further, the requirement of the raw materials for forming these films is markedly smaller than for the conventional slant vapor deposition method, leading to the reduction of the manufacturing cost.

EXAMPLE

A film of $In_2O_3$ having a thickness of 2,000Å was formed by sputtering method on the surface of a glass substrate sized at 10cm×5cm, followed by photo etching so as to form a desired transparent electrode. Then, an $SiO_2$ film 2,000Å thick was formed by chemical vapor deposition on the entire region of the electrode-bearing surface of the glass substrate. Naturally, the transparent electrode was also covered with the $SiO_2$ film. Further, an Si film 90Å thick was laminated on the $SiO_2$ film by chemical vapor deposition, followed by rubbing the surface of the Si film in a predetermined direction with a de-fatted cotton.

Two substrates treated in the above-described fashion where disposed 10μ apart from each other such that the rubbed surfaces of the Si films are allowed to face each other. Then, the outer periphery of the two substrate assembly was sealed with a frit glass so as to prepare a cell. For this frit seal, a heat treatment was conducted in the air for 30 minutes with the highest temperature kept at 520° C. Finally, the resultant cell was loaded with a nematic liquid crystal of BBCA and light-polarizing plates were mounted on both sides of the cell, thereby preparing a liquid crystal display device. The display device thus prepared performed a stable display of a good contrast over the entire display region in spite of the fact that the device was large in size and the frit seal was conducted after the rubbing of the silicon film. Further, the reliability of the display device remained high over a long period of use of the device.

What is claimed is:

1. A method of treating the substrate for a liquid crystal display device to permit unidirectional and horizontal alignment of the liquid crystal molecules, comprising the steps of
    forming a transparent oxide film on the electrode bearing surface of a substrate;
    laminating a silicon film on said oxide film;
    rubbing the surface of said silicon film in a predetermined direction; and
    subjecting the substrate to a heat treatment for oxidizing the silicon film.

2. The method according to claim 1, wherein the oxide film is formed of at least one oxide selected from the group consisting of silicon dioxide, aluminum oxide, yttrium oxide and titanium oxide.

3. The method according to claim 1, wherein the oxide film is formed in a thickness ranging between 100Å and 3,000Å.

4. The method according to claim 1, wherein the silicon film is formed in a thickness ranging between 50Å and 300Å.

5. The method according to claim 4, wherein the silicon film is formed in a thickness ranging between 70Å and 100Å.

6. The method according to claim 1, wherein the heat treatment for the oxidation of the silicon film is conducted simultaneously with the frit seal for forming a cell.

7. A method of treating the substrate for a liquid crystal display device to permit unidirectional and horizontal alignment of the liquid crystal molecules, comprising the steps of forming a silicon dioxide film having a thickness of 100 to 3,000Å on the electrode-bearing surface of a glass substrate;

laminating a silicon film having a thickness of 50 to 300Å on said silicon dioxide film;

rubbing the surface of said silicon film in a predetermined direction; and subjecting the substrate to a heat treatment simultaneously with the frit seal for forming a cell.

* * * * *